US006847957B1

(12) United States Patent
Morley

(10) Patent No.: US 6,847,957 B1
(45) Date of Patent: Jan. 25, 2005

(54) DYNAMICALLY EXTENSIBLE RULE-BASED EXPERT-SYSTEM SHELL FOR DATABASE-COMPUTING ENVIRONMENTS

(75) Inventor: Todd McKay Morley, Woodland Park, CO (US)

(73) Assignee: Oracle International Corporation, Redwood SHores, CA (US)

( * ) Notice: Subject to any disclaimer, the term of this patent is extended or adjusted under 35 U.S.C. 154(b) by 575 days.

(21) Appl. No.: 09/921,182

(22) Filed: Aug. 1, 2001

(51) Int. Cl.[7] .................................................. G06F 17/00

(52) U.S. Cl. ............................................ 706/47; 706/60

(58) Field of Search ...................................... 706/47, 60

(56) References Cited

U.S. PATENT DOCUMENTS 5,682,535 A * 10/1997 Knudsen ..................... 717/117

* cited by examiner

*Primary Examiner*—George Davis

(74) *Attorney, Agent, or Firm*—Wagner, Murabito, & Hao LLP

(57) ABSTRACT

A computer-implemented method for flexibly and efficiently representing and applying business rules in a transaction-processing relational database management system (RDBMS) environment. The method includes providing a deterministic rule-based expert-system shell. A late-binding mechanism within the RDBMS environment is also provided. An extensible data-maintenance mechanism is created for the rule-based expert-system shell. The extensible data-maintenance mechanism maintains sets of approval rules governing business transactions generated by other transaction-processing applications. The data-maintenance mechanism uses late binding to make the sets of rules and rule components stored in the data-maintenance mechanism arbitrarily extensible. A rule-processing engine applies the sets of approval rules stored in the extensible data-maintenance mechanism to business transactions originating in transaction-processing applications. The method provides for a plurality of approval-rule types, each making a qualitatively different contribution to the list of approvers required for any given business transaction. The method calculates the list of approvers required for a given business transaction by applying the appropriate set of approval rules to the transaction.

22 Claims, 4 Drawing Sheets

DYNAMICALLY EXTENSIBLE RULE-BASED EXPERT-SYSTEM SHELL FOR DATABASE-COMPUTING ENVIRONMENTS

FIELD OF THE INVENTION

The field of the present invention pertains to transaction processing relational database management system (RDBMS) environments. More particularly, the present invention relates to a method and system for efficiently representing and applying business rules in a transaction processing RDBMS environment.

BACKGROUND OF THE INVENTION

One of the most important societal changes of recent times has been the emergence of the Internet, more particularly, the World Wide Web (e.g., the Web), as a predominant communications medium. The Web represents all the computer's on the Internet that offer users access to information and documentation media interactive hypermedia, or Web pages. Web pages describe documents in which hypertext links are used connecting a multitude of combinations of graphics, audio, video, and text. Such combinations are often interlined and interconnected in nonlinear, nonsequential manners.

The vast majority of corporations in the modern business world have adopted Web based technology to accomplish their normal business functions. These businesses have moved much of their basic processes, activities, functions, and the like "on-line" wherein the processes/activities are available electronically to an interwoven network of business suppliers, and operators, as well as customers. Transaction processing is one such function.

Transaction processing is the prototype of information processing system in business service organizations. Transactions referred to sets of discrete inputs, for example, submitted by users at unpredictable intervals, which call for database searching, analysis, and/or modification. The server evaluates the requests and executes them in response to user queries. Response time (the elapsed time between the end of a request and the beginning of the reply) is an important characteristic of the performance of a transaction processing system, wherein "real-time" teleprocessing is the desired goal. Some transaction-processing systems often incorporate private telecommunications networks. However, a majority of the more modern transaction processing systems are moving towards Internet based standards. Internet based transaction processing systems are increasingly comprising the foundation of service industries such as banking, insurance, securities, transportation, and libraries. However it should be noted that Web, or Internet, or Intranet settings are merely typical.

The general problem with such transaction processing systems is how to represent and apply business rules in a transaction-processing RDBMS environment. The specific case of the problem (which necessarily employs a technology applicable to the general problem) is how to represent and apply business rules that define a transaction's approval process (typically, a list of managers who must approve the transaction) in a transaction-processing environment. For example, expense reports and purchase requisitions typically require approvals by one or more employees in a managerial hierarchy, and transaction-processing applications such as Oracle's Web Expenses and Internet Procurement must somehow define and apply the rules that determine how far up the hierarchy a transaction's approver list must ascend. Transactions often require approvals by functional specialists (e.g. HR representatives, financial analysts, and legal departments) before or after all approvals in the hierarchy have occurred, and a transaction-processing application must make special provision for such non-hierarchical approvers.

Until now, each transaction-processing application in an RDBMS business environment has hard-coded either a fixed set of business rules, or a fixed framework for defining business rules on a fixed set of "transaction attributes" (decision variables) such as a transaction's total (e.g. dollar) amount. In either case, the application limits its rules to a fixed list of available hierarchies (typically a single managerial hierarchy). Such application's provisions for non-hierarchical approvers are similarly fixed and non-extensible. If an organization using such an application desires to extend the application's approval rules beyond the fixed limits imposed by the application's approval-rules paradigm, for example by:

(i) defining new transaction attributes and including them in the business rules;

(ii) defining a new approvals hierarchy and requiring it in the rules;

(iii) defining approval groups for non-hierarchical approvers; or (iv) altering the approver list in various possible ways at runtime; the organization must customize the application's source code to achieve the desired extension. Moreover, it has so far been wholly impractical for several transaction-processing applications to share a set of approval rules or a single paradigm or environment for defining such rules. Even if, in human terms, the business rules are the same across several applications, each application has its own architecture for representing and calculating on the rules, so the rules must be translated, by hand, by skilled personnel, into each application's paradigm.

SUMMARY OF THE INVENTION

Embodiments of the present invention are directed towards a dynamic extensible rule-based expert system shell for transaction processing database computing environments. The present invention provides a solution that solves each of the problems described above. The system of the present invention is a highly extensible, deterministic (nonprobabilistic), rule-based expert-system shell, designed especially for high-volume transaction processing in an RDBMS environment. The present invention provides a method of representing approval rules as data in a completely extensible, highly flexible manner.

In one embodiment, the expert system shell of the present invention comprises a rule-based expert-system shell that implements a late binding mechanism within an RDBMS environment to create a highly extensible mechanism for maintaining as data, and applying, sets of approval rules governing business transactions generated by other transaction-processing applications. The expert system shell of the present invention can be implemented as a general rule-based expert-system shell for use with widely used commercial RDBMS systems, such as, for example, the Oracle RDBMS environment. The expert system shell of the present invention can store and execute on the RDBMS any number of sets of rules, with one set of rules per transaction type registered with the shell.

In one embodiment, the rules form the logical operator "if set of conditions then action", where the conditions in the set of conditions can (in principle) be combined using the Boolean operators 'not', 'or', and 'and', as well as a grouping operator (parentheses), and the action is (in principle) an arbitrary SQL statement. Each condition has the form:

attribute in set of allowed values.

Each attribute (decision variable) is defined as an attribute name having a given attribute type (Boolean, string, date, number, currency) and one query string (per transaction type) that returns the attribute's value for any given valid transaction identifier. Each attribute type can be single valued, except the currency type, which has three values (amount, currency denomination, and currency-conversion method).

In one embodiment, the expert system shell of the present invention maintains as data, and applies, sets of approval rules for business transactions generated by other programs running on the RDBMS. Traditionally, transaction-processing applications in business-application suites have either captured approval-process rules as code, or they have given end users very stratified, narrow frameworks for defining approval rules for the application's transactions. For example, the lists of attributes, action types and their actions, and/or approval groups, have been fixed. To change a rule, or to extend an application's rule-representation apparatus, it was necessary to customize the application's source code. Rule sharing between transaction-processing applications was not possible. In contrast, the present invention maintains can share and apply sets of approval rules for business transactions generated by other programs running on the RDBMS.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
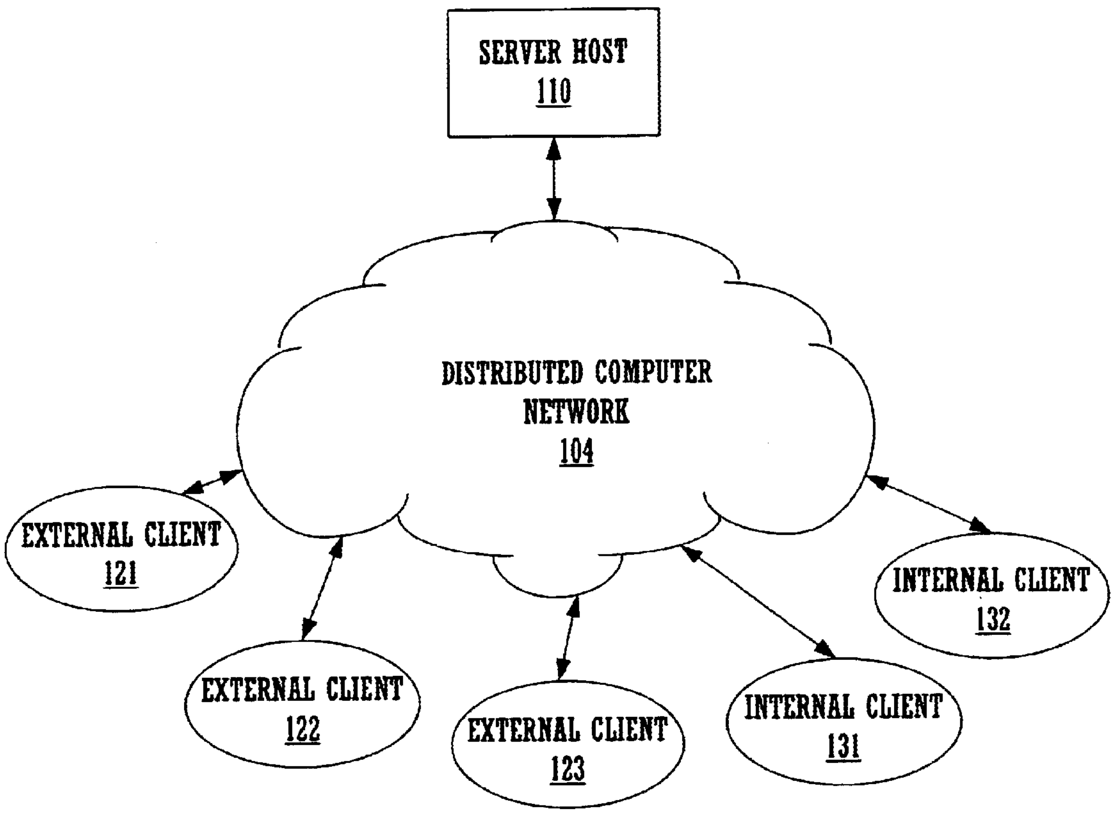
FIG. 1 shows one example of an implementation of the expert system shell of the present invention, as in the context of a client server computer environment.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed towards a dynamic extensible rule-based expert system shell for transaction processing database computing environments. The present invention provides a solution that solves each of the problems described above. The system of the present invention is a highly extensible, deterministic (nonprobabilistic), rule-based expert-system shell, designed especially for high-volume transaction processing in an RDBMS environment. Embodiments of the present invention provide a method of representing approval rules as data in a completely extensible, highly flexible manner. The method and system of the present invention and its benefits are further described below

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 412 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

In one embodiment, the present invention is implemented as a dynamic extensible rule-based expert system shell application (hereafter referred to simply as "the system shell") for transaction processing database computing environments. The expert system shell product or component of the present invention solves each of the problems of the prior art, for example, with regard to non-extensibility beyond fixed limits imposed by a strict approval-rules paradigm, non-shareable approval rules, non-shareable paradigms or environments, and the like.

FIG. 1 shows one example of an implementation of the expert system shell of the present invention, as in the context of a client server computer environment. As depicted in FIG. 1, the RDBMS functionality of the present invention is hosted on server host 110. A distributed computer network

101 links host 110 to both internal clients 131–132 (e.g., as in an Intranet) and external clients 121–123 (e.g., as in external clients connecting across the Internet). The configuration of FIG. 1 is one example of many possible configurations of the expert system shell of the present invention.

The expert system shell of the present invention is a highly extensible, deterministic (non-probabilistic), rule-based expert-system shell, designed especially for high-volume transaction processing in an RDBMS environment. The expert system shell of the present invention applies general theoretical concepts of a deterministic rule-based expert system to the RDBMS arena. The expert system shell of the present invention represents approval rules as data in a completely extensible, highly flexible way that is new to the world of transaction-processing RDBMS transaction processing applications (such as the Oracle Applications suite).

In the expert system shell of the present invention, a business rule has the following form:

if, for a given transaction in a given transaction-processing application,
  the value of attribute I is in set_of_possible_values_1 and
  the value of attribute_2 is in the set_of_possible_values_2 and . . . then modify the transaction's approver list as required by approval_action In the above example, each "condition" (a condition states that an attribute's value is in a set of possible values; there are two conditions in the illustration above) in the rule's "antecedent" (if part) must be true, for the rule to apply to a transaction. The expert system shell of the present invention can incorporate Boolean operators (e.g., and, or, not) on conditions.

The expert system shell of the present invention represents transaction attributes as an attribute name that several transaction-processing applications can share, while allowing each application to define a unique SQL query string whose execution determines the attribute's value at runtime, for transactions originating in the transaction processing application that originated the transaction. The expert system shell stores the attribute name and the query strings as data in a database table; and it allows end users to create new attribute names, define and edit attribute query strings, and share attribute names across transaction-processing applications. Attributes can be strongly typed as numbers, dates, strings, Boolean, or currency values (which consist of an amount, a currency denomination, and a method for converting to other denominations). Virtually all data in a transaction-processing application can be represented as one of these types. Thus the expert system shell effectively imposes no limits on the transaction attributes that an organization can include in its business rules for transaction approvals. The expert system shell executes transaction attributes' query strings using PL/SQL's runtime-binding ("dynamic PL/SQL") mechanism, so that defining and fetching values for a new transaction attribute requires no alteration of source code, either in the expert system shell of the present invention (the expert system shell) or in an external transaction-processing application.

All external transaction-processing applications using the expert system shell of the present invention can use the set of conditions defined on a given attribute name, as long as they have defined a query string for the attribute. It should be noted that this feature is necessary for rule sharing.

The expert system shell of the present invention defines an approval action (the "then" part of a rule) as having an approval type, a parameter, and a description (again, all data in a database table). An approval type, in turn, is defined by a name, the name of a PL/SQL package or procedure implementing the type, and a list of approval actions computable by the package or procedure. All of these are also stored as data. One can generally extend a given approval type by defining a new approval action, simply by inserting a new row specifying a new parameter and description into the expert system shell's approval-actions table. (The parameter must adhere to whatever syntactical and semantic requirements the approval type imposes on its actions' parameters.) Moreover, one can create a new approval type by first creating the appropriate PL/SQL package or procedure and then inserting a new row specifying the new approval type's name and procedure or package name into the application's approval-types table. As with transaction attributes, the present invention executes the procedure (or the package's procedures) using runtime binding (dynamic PL/SQL), so that defining a new approval type requires no alteration of source code in the application or an external transaction-processing application. Thus, in particular, the expert system shell imposes no constraints on the type of approvals hierarchy available for use in approval rules.

Approval types and approval actions are shared among all transaction-processing applications that use the expert system shell. The experts system shell's approval-types mechanism is robust in the sense that it allows for the definition of six different types of business rules:

(i) "List-generation" rules specify requirements for approvals up to a given level of a given hierarchy, or possibly given levels of several given hierarchies. (Thus a single transaction's approver list can include approvers in arbitrarily many chains of authority in arbitrarily many hierarchies.)

(ii) "Exception" rules suppress certain classes of list-generation rules in narrow special cases. (iii) "Substitution" rules substitute one approver for another, after all hierarchical approvers have been added to a transaction's approver list.

iv) "List-modification" rules modify a transaction's approver list in an arbitrary way (e.g. by truncating or extending it, or by inserting an approver identified by a transaction attribute at runtime), after all hierarchical approvers have been added to the list, and all substitutions have been performed.

v) "Pre-approval" rules add an approval group (see below) to the approver list, before all hierarchical approvers.

(vi) "Post-approval" rules add non-hierarchical approval groups after all hierarchical approvers.

In accordance with the present embodiment, each transaction-processing application can define its own rules in the expert system shell of the present invention, and several transaction-processing applications can share one or more rules, so that an organization using the expert system shell can store shared rules in a single location.

The expert system shell of the present embodiment lets its users define and maintain "approval groups", ordered groups of approvers, for use in pre-and post-approval rules. The expert system shell's architecture includes features to allow approval-group members to be determined at runtime, e.g., by the value of a transaction attribute. Approval groups are shared across transaction-processing applications.

In one embodiment, the expert system shell's application programming interface (API) has two main features:

(i) The API lets a transaction-processing application pass the expert system shell a transaction identifier and receive from the expert system shell of the identity of the next required approver for the transaction (or indeed the entire current approver list for the transaction). When the transaction obtains the approver's response to its request for approval of the transaction, the application passes the response to the expert system shell and requests the identity of the transaction's next approver, until all required approvers have approved the transaction. Thus, a transaction-processing application no longer has to have its own fixed mechanisms for representing and computing on business rules. It merely needs a programming interface to the expert system shell and a mechanism for requesting approvals and receiving responses to those requests. One example would be an "Oracle Application" using "Oracle Workflow" for such functionality.

(ii) The API lets transaction-processing applications insert approvers into a transaction's approver list at runtime, and it lets the application choose any of several possible order relations for fixing the inserted approver's position in the approver list (absolute order, before a given approver, after a given approver, first pre-approver, first chain-of-authority approver, first post-approver, last pre-approver, last post-approver, etc.). In particular, if a hierarchical approver "forwards" a request for approval to an approver other than her or his immediate superior, the application can communicate this fact to the expert system shell and the expert system shell will regenerate the relevant chain of authority within the approver list in subsequent calls to the API. Likewise the API allows deletion of approvers at runtime under appropriate conditions.

In the present embodiment, each time an application calls the expert system shell's API, the expert system shell's rule-processing engine regenerates the relevant transaction's approver list, thereby accounting for possible changes in four areas:

(i) transaction attributes' values;
(ii) applicable business rules;
(iii) organizational structure; and
(iv) approval-group definitions.

The expert system shell lets end users "register" a transaction-processing application with the expert system shell via a ubiquitous Web interface. Once an application has been registered, it can call the expert system shell's API. Thus, the expert system shell places no constraints on the number or kinds of applications that store approval rules in the expert system shell and rely on the expert system shell to generate approver lists for their transactions, even custom applications can easily use the expert system shell of the present invention.

Finally, the expert system shell includes a robust set of seed data for each transaction processing application (e.g., Oracle Applications) that has migrated to the expert system shell. The seed data include:

(i) all transaction attributes that the application either uses currently, or anticipates end users wanting to use; and (ii) all approval types that correspond to possible rule outcomes in the application. (For example, the self-service HR application currently requires a chain of authority that ascends two hierarchies, for employee-transfer transactions. Many applications define an approval type to generate such chains of authority, and the attribute distinguishing employee-transfer transactions from other HRS S-transactions.)

This means users of transaction processing applications (e.g., Oracle Applications) should find it easy to migrate their approval rules into the expert system shell of the present invention, and thereafter use the expert system shell to maintain the rules.

Thus the expert system shell of the present invention provides the advantages such as:

i) The expert system shell overcomes the prior art limitations inhering in fixed sets of transaction attributes, fixed approval hierarchies, fixed or statically defined approval groups, and narrow rule typologies.

ii) The expert system shell enables rule sharing across transaction-processing applications.

iii) And, by representing rules and rule components as data (all viewable and editable with a Web browser) rather than compiled application code, with the expert system shell avoids code customizations previously necessary to express unanticipated business rules within-a transaction-processing environment.

Consequently, business organizations can greatly streamline and ease the rule maintenance, rule consistency, and rule flexibility for transaction processing systems. For example, using the expert system shell of the present invention, a business information technology department can create and test in a single person-day a set of approval rules that represent between one and two person-years of code-customization work required in prior art rule-based transaction processing systems. The above man-hour savings have been measured and proven under actual operating conditions. Because of the difficulty of effecting code customizations to express changes of business rules, information technology departments often delay implementing business-rule changes as code customizations for months, or even deny requests for such implementations altogether. Using the expert system shell of the present invention, an information technology department of a business will be able to implement business-rule changes as quickly as management decides on them. Any organization using the expert system shell of the present invention will similarly enjoy two-orders-of-magnitude reductions in costs associated with approval-rule implementation in a transaction-processing RDBMS environment. Additionally, many application customization programmers currently developing and maintaining approval-rules code can migrate to the expert system shell of the present invention and eventually obsolete their particular approvals-rule solutions (thereby dramatically decreasing code-maintenance cost for the one or more business applications customization teams within a business' information technology department).

Additionally, the rule-representation architecture and runtime engine of the expert system shell of the present invention are highly extensible and flexible, allowing non-technical business users to implement an extremely broad class of approval rules as data entered and maintained via a Web interface, modifying the rules at will, usually without any assistance from technical personnel, and always without any modifications to application source code.

Another advantage is the fact that the expert system shell lets organizations share approvals rules across several transaction-processing applications. This will encourage businesses to rationalize and simplify their approval rules, making it easy to specify, for example, a uniform signing authority for managers at a given level of a given hierarchy, regardless of the application in which a transaction occurs.

With respect to external environments (e.g., environments outside of the RDBMS in which a company has implemented the expert system shell of the present invention), any transaction-processing application can use the expert system shell to manage its transactions' approver lists. The application merely requires a simple programming interface to the expert system shell. Thereafter, an end user can register the application with the expert system shell, and the application can begin using the expert system shell to manage its approvals. For example, the application could run outside of an Oracle RDBMS if it included a programming interface to computer system shell's PL/SQL or Java API.

Thus, the present invention is directed towards a dynamic extensible rule-based expert system shell for transaction processing database computing environments. The present invention provides a solution that solves each of the problems described above. The system of the present invention is a highly extensible, deterministic (nonprobabilistic), rule-based expert-system shell, designed especially for high-volume transaction processing in an RDBMS environment. The present invention provides a method of representing approval rules as data in a completely extensible, highly flexible manner.

Figure 2:
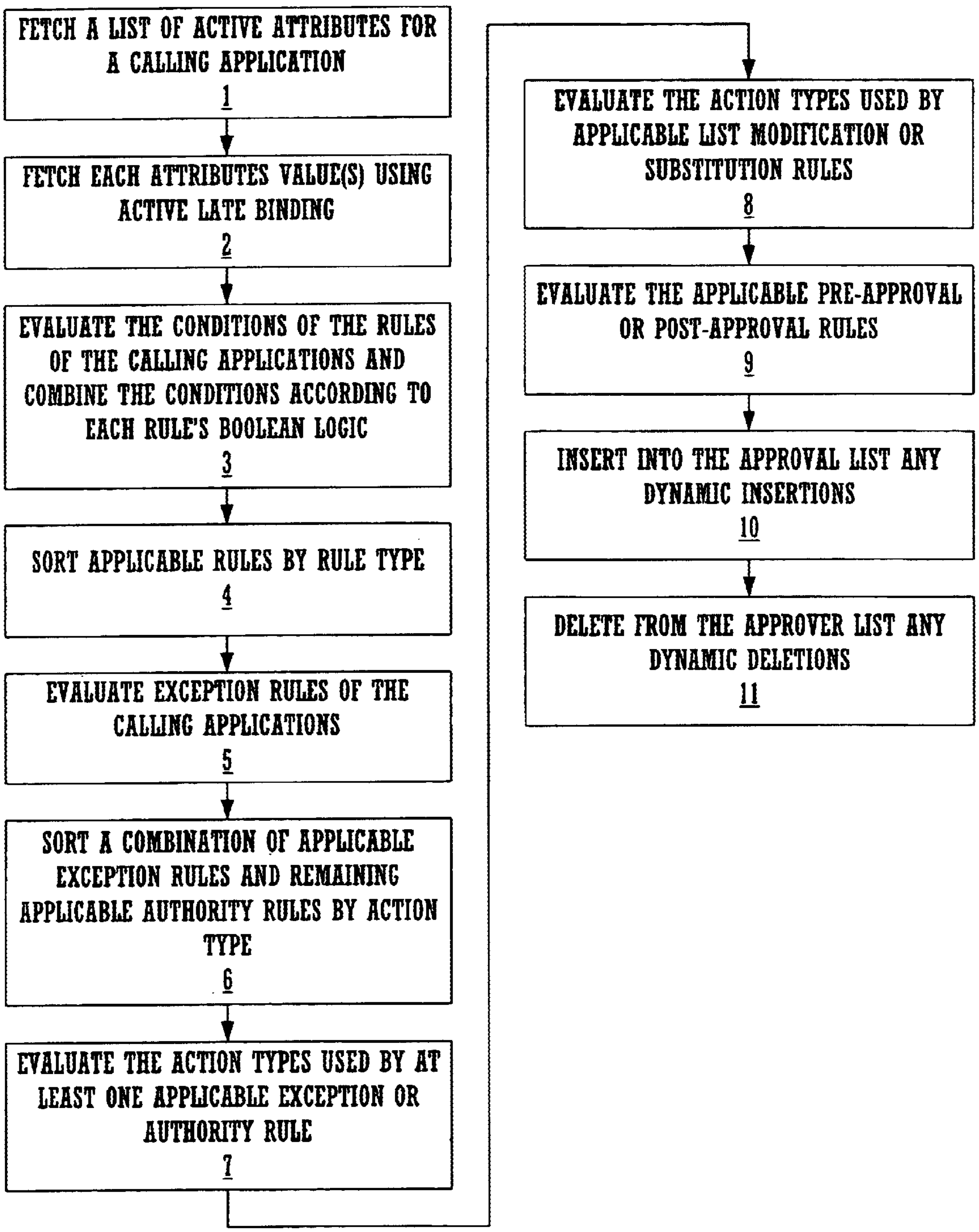
FIG. 2 shows a flowchart of the steps of an expert system shell process in accordance with one embodiment of the present invention.

FIG. 2 shows a flowchart of the steps 1–11 of an expert system shell process in accordance with one embodiment of the present invention. The following pseudocode depiction describes the operations of the steps 1–11.

Step 1: Fetch the list of active attributes for the calling application.

Step 2: Fetch each active attribute's value(s) using dynamic PL/SQL (late binding).

Step 3: For each rule in the calling application's set of rules, 3.1 For each condition in the current rule's set of conditions, if the value of the condition's attribute falls within the conditions set of allowed values, set the condition true;

otherwise, set the condition false.

3.2 Combine the conditions according to the rule's Boolean logic.

Set the condition set's truth value to the result. (The rules with true conditions sets are <<applicable rules>>.)

Step 4: Sort the applicable rules by rule type.

Step 5: For each applicable exception rule, compare the set of attributes on which the rule's ordinary conditions are defined with the same attribute set for each applicable authority rule; and delete from the set of applicable authority rules any authority rule having the same set of ordinary-condition attributes as the exception rule.

Step 6: Sort the combination of the applicable exception rules and the remaining applicable authority rules by action type.

Step 7: For each action type used by at least one applicable exception or authority rule;

7.1 Aggregate the action parameters of the rules using the action type.

7.2 Call the action type's handler code (passing it the set of action parameters from step 7.1) using dynamic PL/SQL iteratively.

7.2.1 Insert into the chain of authority under construction any dynamically inserted approvers (approvers inserted by the calling application via a previous API call) required at the current step in the chain.

7.2.2 Check whether the current approver has final authority for the current transaction and the current action type. If so, stop step 7.2.

7.2.3 Call the handler to fetch the next required approver in the chain of authority generated by the action type.

Step 8: For each action type used by at least one applicable list-modification or substitution rule;

8.1 Aggregate the action parameters of the rules using the action type.

8.2 Pass the parameter set and the current approver list to the action type's handler (using dynamic PL/SQL).

Step 9: For each action type used by at least one applicable pre-approval rule;

9.1 For each pre-approval rule of the current action type having dynamic membership, fetch the group's membership (using dynamic PL/SQL).

9.2 Aggregate the membership of the approval groups used by the pre-approval rules of the current action type.

9.3 Pass the aggregated group members and the current approver list to the action type's handler (using dynamic PL/SQL).

Step 10: Repeat step 9 for any applicable post-approval rules.

Step 11: Delete from the approver list any dynamic deletions (approvers deleted by the calling application via a previous API call).

Figure 3:
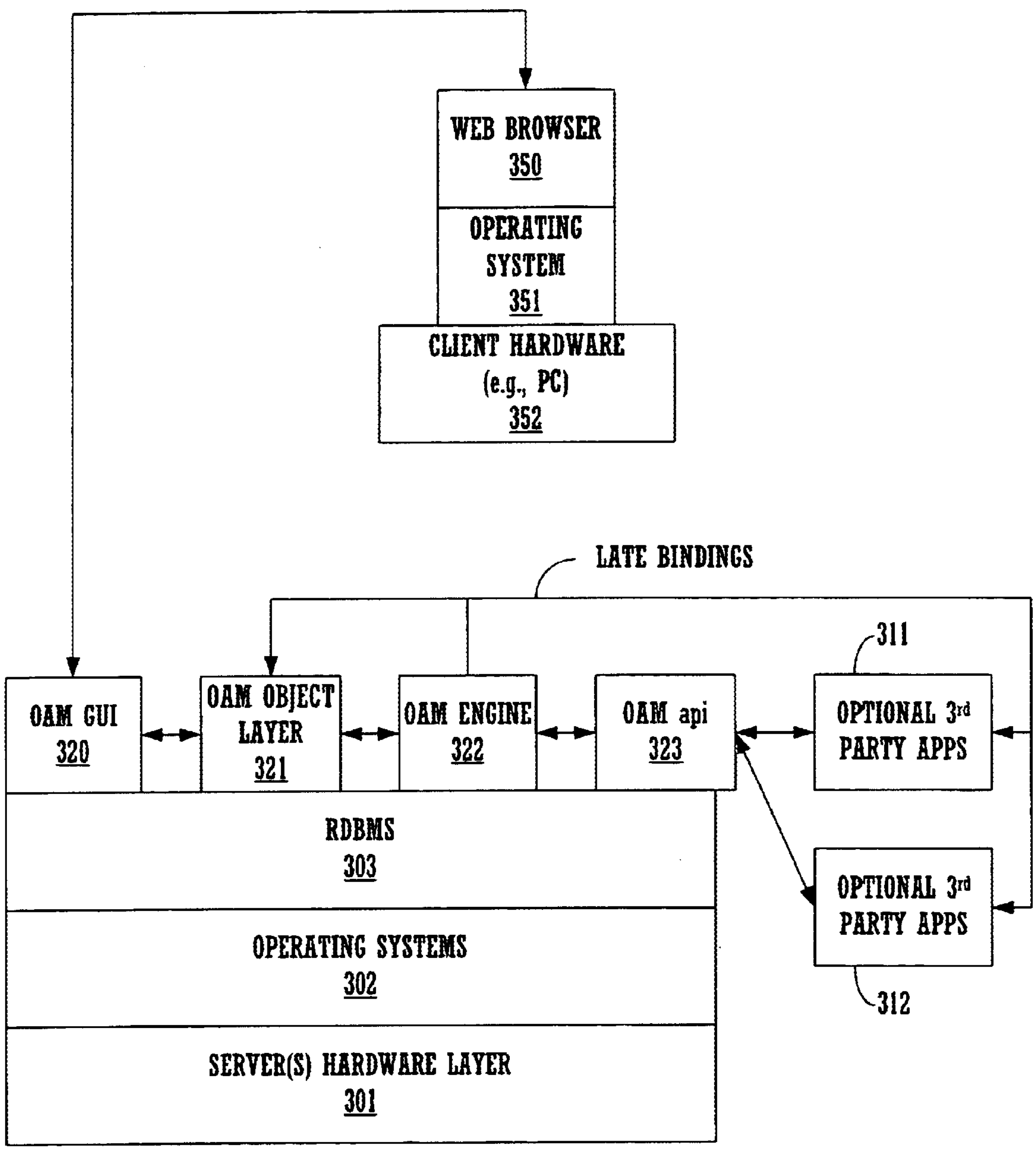
FIG. 3 shows a block diagram of one exemplary embodiment of the components which implement the functionality of the expert system shell of the present invention.

FIG. 3 shows a block diagram of one exemplary embodiment of the components which implement the functionality of the expert system shell of the present invention. Referring to FIG. 3, in general, an RDBMS (e.g., an Oracle RDMBS) runs on some database server or servers 301 (the physical computer or computers, connected by an ethernet in the latter case). The operating systems 302 run on the servers. The RDBMS 303 runs "on top of" the operating systems. Optional third-party or custom applications 311–312, communicates with the OAM applications 320–323 via its (PL/SQL or Java) API. In this embodiment, the OAM components refer to "Oracle Application Manager" components. The API 323 communicates transaction processing applications 311–312. The engine 322 queries OAM applications 320–323 object layer, which consists of tables on the RDBMS 303 that contain definitions of OAM objects such as attributes, conditions, rules, action types, and approval groups. Action-type "handler" code is compiled on the RDBMS 303 and "registered" with OAM through OAM's UI 320. The engine 322 also communicates with certain parts of its object layer (dynamically defined approval groups, action types) via dynamic PL/SQL, which is a late-binding mechanism that PL/SQL uses to locate and execute code at runtime (e.g., transaction processing applications 311–312). Again, the engine 322 uses dynamic PL/SQL to execute dynamically the query strings stored in its object layer that determine at runtime the values of attributes used in the calling application's rules.

An end user interacts with the system by calling the application's set of rules by using a Web browser 350 (e.g., executing on a operating system 351 on client hardware 352) to interact with OAM's user interface (UI) 320. An end user also typically interacts with the calling application proper via a Web browser, though this is not an essential feature of the architecture of the present invention.

Computer System Platform

Figure 4:
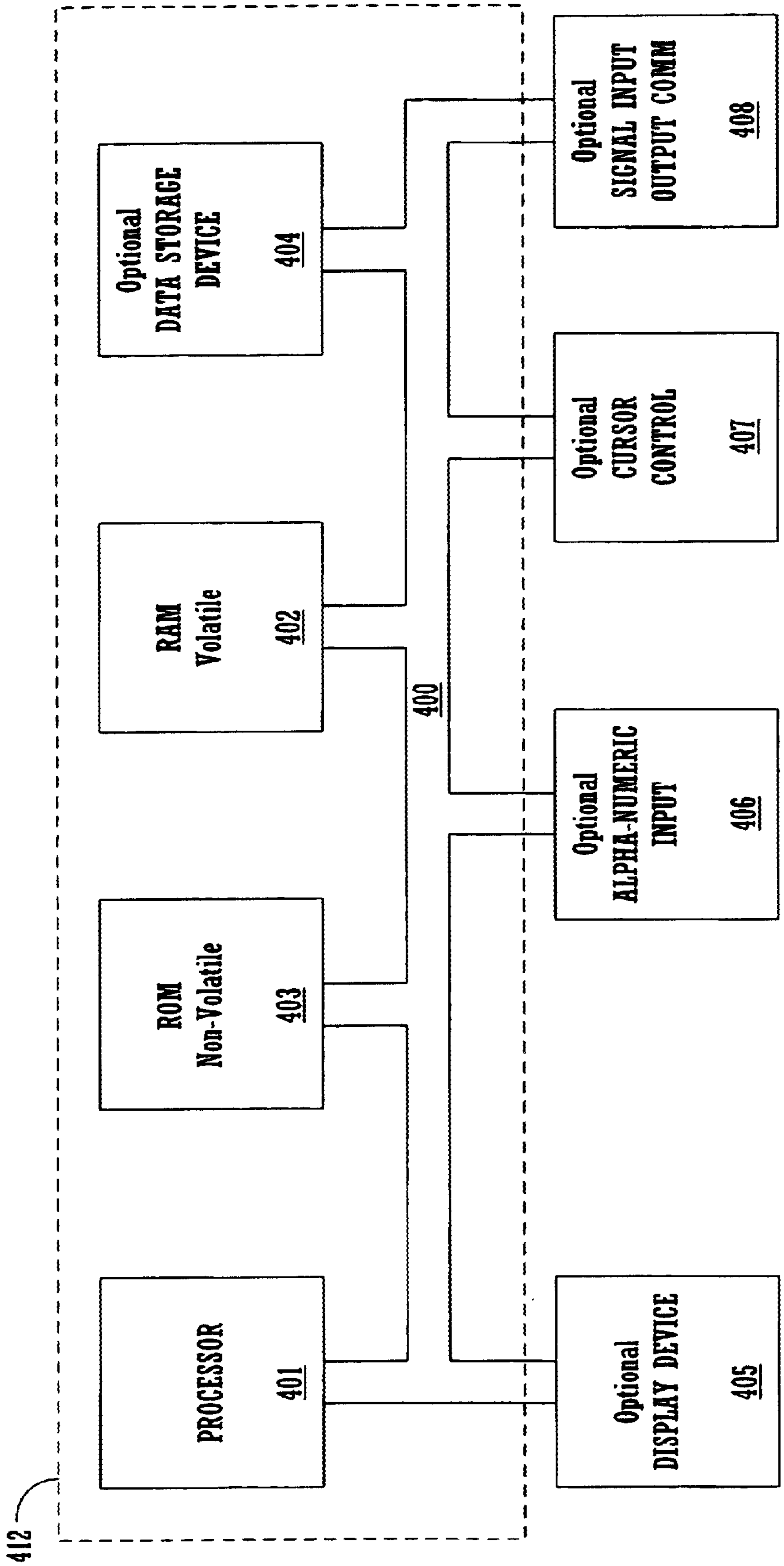
FIG. 4 shows a computer system in accordance with one embodiment of the present invention.

With reference now to FIG. 4, a computer system 412 in accordance with one embodiment of the present invention is shown. Computer system 412 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 412) and are executed by the processor(s) of system 412. When executed, the instructions cause the computer system 412 to implement the functionality of the present invention as described above.

In general, computer system 412 shows the basic components of a computer system used to implement "server"

machines and "client" machines. Computer system 412 comprises an address/data bus 400 for communicating information, one or more central processors 401 coupled with the bus 400 for processing information and instructions, a computer readable volatile memory unit 402 (e.g., random access memory, static RAM, dynamic, RAM, etc.) coupled with the bus 400 for storing information and instructions for the central processor(s) 401, a computer readable non-volatile memory unit (e.g., read only memory, programmable ROM, flash memory, EPROM, EEPROM, etc.) coupled with the bus 400 for storing static information and instructions for the processor(s) 401. System 412 also includes a mass storage computer readable data storage device 404 such as a magnetic or optical disk and disk drive coupled with the bus 400 for storing information and instructions. Optionally, system 412 can include a display device 405 coupled to the bus 400 for displaying information to the computer user, an alphanumeric input device 406 including alphanumeric and function keys coupled to the bus 400 for communicating information and command selections to the central processor(s) 401, a cursor control device 407 coupled to the bus for communicating user input information and command selections to the central processor(s) 401, and a signal generating device 408 coupled to the bus 400 for communicating command selections to the processor(s) 401.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method for efficiently representing and applying business rules in a transaction processing relational database management system environment, comprising:

providing a rule-based expert-system shell;

providing a late-binding mechanism within a RDBMS (relational database management system) environment;

creating an extensible data maintenance mechanism using the rule-based expert system shell and the late binding mechanism; and managing sets of approval rules governing business transactions generated by other transaction-processing applications by using the set of approval rules applied to the extensible data maintenance mechanism.

2. The method of claim 1 wherein extensible data maintenance mechanism is configured to execute within the RDBMS environment.

3. The method of claim 1 wherein extensible data maintenance mechanism is configured to store and execute on the RDBMS a plurality of sets of rules, wherein one set of rules per transaction type is registered with extensible data maintenance mechanism.

4. The method of claim 1 wherein the approval rules to define conditions which can be manipulated using the Boolean operators.

5. The method of claim 1 wherein the expert system shell is configured to execute rules using a same action type within a given rules type to provide extensibility.

6. The method of claim 1 wherein extensible data maintenance mechanism is configured to allow an end user to create, edit, or delete attribute names of the approval rules.

7. The method of claim 1 wherein extensible data maintenance mechanism is configured to allow an end user create, edit, or delete a query string associated with an attribute name for a given transaction type.

8. A computer implemented method for efficiently representing and applying business rules in a transaction processing relational database management system environment, comprising:

providing a rule-based expert-system shell;

providing a late-binding mechanism within a RDBMS (relational database management system) environment wherein the rule-based expert system shell is configured to interpret a query string at runtime via the late-binding mechanism;

creating an extensible data maintenance mechanism using the rule-based expert system shell and the late binding mechanism; and managing sets of approval rules governing business transactions generated by other transaction-processing applications by using the set of approval rules applied to the extensible data maintenance mechanism.

9. The method of claim 1 wherein the rule-based expert system shell is configured to interpret the query string at runtime via a dynamic PL/SQL late-binding mechanism.

10. The method of claim 8 wherein the rule-based expert system shell is configured to allow an end user to create, edit, or delete conditions defined on attribute names for which a given transaction type has defined query strings.

11. The method of claim 10 wherein the rule-based expert system shell is configured to compute a truth value of a condition at runtime by fetching a value of an associated attribute and comparing it with the condition's set of allowed values.

12. The method of claim 8 wherein the rule-based expert system shell is configured to implement an approval-group action, wherein a list of approvers is fetched from a table within the RDBMS, or wherein the rule-based expert system shell executes a PL/SQL procedure to determine the list of approvers.

13. The method of claim 8 wherein the rule-based expert system shell is configured to maintain as data, sets of approval rules for business transactions generated by external applications running on the RDBMS.

14. A computer implemented method for efficiently representing and applying business rules in a transaction processing relational database management system environment, comprising:

providing a rule-based expert-system shell;

providing a late-binding mechanism within a RDBMS (relational database management system) environment wherein the rule-based expert system shell is configured to interpret a query string at runtime via the late-binding mechanism;

creating an extensible data maintenance mechanism using the rule-based expert system shell and the late binding mechanism;

defining a plurality of types of approval rules, each of the approval rules making a respective contribution to a list of approvers required for a transaction; and managing the approval rules by applying the approval rules to the extensible data maintenance mechanism.

15. The computer implemented method of claim 14 wherein the extensible data maintenance mechanism is configured to use list-generation or authority rules to determine a chain of authority a list includes, and where each said chain begins and ends.

16. The computer implemented method of claim 14 wherein the extensible data maintenance mechanism is configured to use exception rules to suppress otherwise applicable authority rules sharing a common set of attributes with an exception, thereby enabling the applications of different action types to narrow sets of circumstances.

17. The computer implemented method of claim 14 wherein the extensible data maintenance mechanism is configured to use list-modification rules to modify a transaction chain of authority when a certain approver is in a specified position in a approver list.

18. The computer implemented method of claim 14 wherein the extensible data maintenance mechanism is configured to use substitution rules to substitute one approver for another approver, when the other approver is found in a transaction's approver list.

19. The computer implemented method of claim 14 wherein the extensible data maintenance mechanism is configured to use pre-approval rules to augment a transaction chain of authority with members of an approval group, such that the approval group precedes the transaction chain of authority.

20. The computer implemented method of claim 14 wherein the extensible data maintenance mechanism is configured to use post-approval rules to augment a transaction chain of authority with members of an approval group, so that the approval group follows the transaction chain of authority.

21. A computer implemented method for efficiently representing and applying business rules in a transaction processing relational database management system environment, comprising:

a) determining applicability of each of a plurality of rules and forming a set of applicable rules there from;

b) removing from the set of applicable rules those rules suppressed by an applicable exception rule;

c) sorting remaining authority and exception rules by action type;

d) executing each action type required by the remaining authority exception rules;

e) determining the applicability of each of a set of list-modification and list substitution rules to a chain of authority resulting from the step d);

f) sorting the list-modification rules by action type and executing each action type;

g) repeat step f) for applicable substitution rules; and h) augmenting an approver list from step g) above with members of approval groups required by any applicable pre-approval rules.

22. The computer included method of claim 21 further including:

altering an approver list by adding approvers to the approver list or removing approvers from the approver list by using a transaction-processing application via API calls.

* * * * *